March 15, 1927. 1,621,415
P. W. JOHNSON
FABRICATED SPRING SUPPORT
Filed Oct. 20, 1925
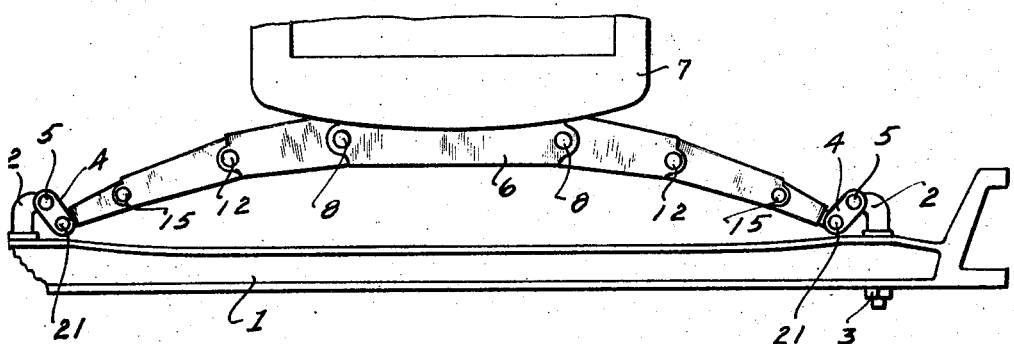
Fig. 1
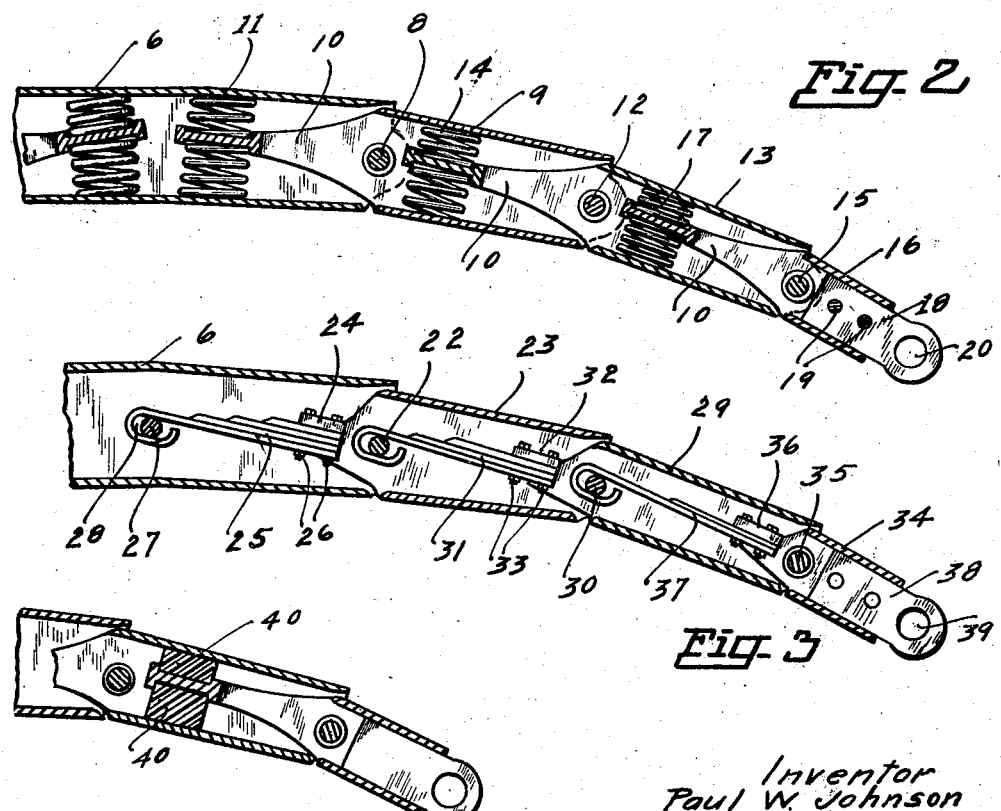
Fig. 2
Fig. 3
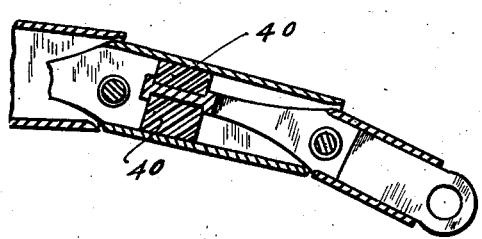
Fig. 4
Inventor
Paul W. Johnson
By Attorney Patented Mar. 15, 1927.

1,621,415

UNITED STATES PATENT OFFICE.

PAUL W. JOHNSON, OF PORTLAND, OREGON.

FABRICATED SPRING SUPPORT.

Application filed October 20, 1925. Serial No. 63,720.

My invention relates to improvements in a fabricated spring support, as the same may be applied to motor vehicles and has for its object a spring support that will act as a spring support and at the same time will react to prevent a rebound of the motor vehicle.

A further object of my invention, consists in the construction of a spring having a flexibility for its full length that will give a greater resiliency than is obtained by the ordinary laminated spring, in general use at the present time.

A further object of my invention, resides in the elimination of the slippage of the laminations one upon the other, thus eliminating the squeaks and other annoyances of the laminated spring.

A further object of my invention, resides in the different units composing the same being journaled about cross shafts and having springs disposed about one end to cushion the same.

A further object of my invention, resides in a construction adapted to eliminate, in so far as possible, dust from the working parts.

With these and other incidental objects in view, the invention consists in certain novel features of construction and combination of parts, the essential elements of which are set forth in the appended claims, and to a preferred form of embodiment of which is hereinafter shown with reference to the drawings which accompany and form a part of this specification.

In the drawings:—

Fig. 1 is a front elevation of a front axle, illustrating one of my spring supports in position upon the same.

Fig. 2 is a partial longitudinal, sectional view of one end of a spring, illustrating a preferred form of embodiment of my device.

Fig. 3 is a partial longitudinal, cross sectional view of another form of a preferred embodiment of my device.

Fig. 4 is still another form of a preferred embodiment of my device, here shown partially in a longitudinal sectional view.

Like reference characters refer to like parts throughout the several views.

1 is the axle of the motor vehicle, having supporting members 2, disposed at the outer end of the axle, the same being maintained in position by a nut 3, disposed on the lower side thereof. A link 4, is attached to the supporting member 2, through the means of a journal shaft 5, that maintains the link in pivotal relationship with the supporting member 2. A central link member 6, composes the central section of the fabricated spring support and this section and the sections 9, 13 and 16 are so made that they are adapted to engage into each other and are in pivotal relationship with each other, and to form a comparatively dust tight compartment. The central sections 6, have journal shafts 8, which pass through the opposite walls composing the same. These journal shafts may be secured in position, as by being peaned over on the outer ends, or by other suitable means. These journal shafts should be sufficiently large to eliminate undue wear, through the severe service for which they are intended.

In the form of embodiment, as illustrated in Fig. 2, the central section 6, has the journal shaft 8, disposed thereacross about which the section 9 oscillates; the section 9 has disposed on its enclosed end 10, a shape suitable for engaging with the compression spring 11, in such a manner as to seat the spring and maintain the same in position to cushion the shocks encountered in its use. The section 9, has a journal shaft 12, disposed across its body portion and is maintained in position within the side walls of the member 9, for journaling the section 13 therein, and having a suitable means for maintaining the cushion spring 14 therein, as heretofore described. The unit section 13, has a journal shaft 15, thereacross for journaling the section 16, therein and having a means for maintaining the cushion springs 17, in position. This section 16, is the outer terminal section end and has a clip 18, secured therein by suitable fastenings, as rivets 19, and having an opening 20 therein, for engagement with the link 4, through the journal pin 21.

Another modified form is illustrated in Fig. 3, wherein the central section 6, has a journal shaft 22, thereacross for maintaining the section 23, in pivotal relationship therewith. On the inner end of the section 23, a seat 24 is formed, for maintaining laminated springs 25, upon the seat, by suitable fastening means, as bolts 26. The laminated spring engages with the shaft 27, in the central section. A loop is formed upon the lower or longer member of the laminated spring for engagement with the shaft 27. The elongated loop 28, compensates for the movement caused by the flexing of the spring member. The section 29 is journaled about the journal shaft 30, and has a laminated spring 31, secured upon the seat 32, and the spring is maintained thereupon by suitable fastenings, as bolts 33. The loop portion of the lower laminated spring member, engages with the journal shaft 22. The terminal member 34, engages in pivotal relationship with the section 29, through the journal shaft 35, having a seat 36, formed upon the inner end for supporting the laminated spring 37. The terminal member 38, has a bearing 39, formed therein for engagement with the link 4, as heretofore described.

A still further embodiment of my device, is illustrated in Fig. 4, wherein a resilient unit member as cushion rubber 40, is placed within the unit members for absorbing the shock instead of metallic spring members; otherwise the construction being similar.

It will thus be seen that I have formed a fabricated spring support composed of unit sections, wherein the flexing of the units is accomplished without the undue rubbing of metallic surfaces. This construction, when assembled forms a workable tight housing, wherein dust and other materials are prevented from getting into the spring section.

The cushion springs are made smaller or less strong as the same are used a greater distance from the center of the completed spring and the size and strength of the same will vary as the load varies under the conditions where the same are to be used.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:—

1. A fabricated spring support, comprising a central section, a series of sections disposed at either side of said central section the inner ends of each of the outer sections of said series being pivotally mounted within the outer end of the adjacent inner section and having their inner ends projecting inwardly beyond said pivotal mounting; and springs disposed within each of the inner sections to engage the projecting end of the adjacent outer section.

2. A fabricated spring support, comprising a central section, a series of sections disposed at either end of the central section, each outer section having its inner end journaled about cross shafts within the outer end of the adjacent inner section and having its inner end projecting inwardly beyond said cross shafts and springs within each inner section to engage and limit the movement of the projecting end of the adjacent outer section.

PAUL W. JOHNSON.